(12) United States Patent
Muramatsu et al.

(10) Patent No.: US 7,354,557 B2
(45) Date of Patent: Apr. 8, 2008

(54) SMOKELESS POROUS CARBON PRODUCTION METHOD AND ITS PRODUCTION SYSTEM

(76) Inventors: Shigeo Muramatsu, 189-2, Kushizakishinden, Matsudo-shi, Chiba, 270-2216 (JP); Motohiro Shigyo, 902-19, Ozaki, Noda-shi, Chiba, 270-0235 (JP)

( * ) Notice: Subject to any disclaimer, the term of this patent is extended or adjusted under 35 U.S.C. 154(b) by 436 days.

(21) Appl. No.: 10/487,510

(22) PCT Filed: Jul. 26, 2002

(86) PCT No.: PCT/JP02/07610

§ 371 (c)(1),
(2), (4) Date: Aug. 9, 2004

(87) PCT Pub. No.: WO03/060039

PCT Pub. Date: Jul. 24, 2003

(65) Prior Publication Data
US 2005/0051918 A1 Mar. 10, 2005

(30) Foreign Application Priority Data
Jan. 10, 2002 (JP) ............................. 2002-003255

(51) Int. Cl.
*B32B 5/02* (2006.01)
(52) U.S. Cl. .................... 422/156; 422/152; 431/4
(58) Field of Classification Search ................ 422/50, 422/156, 152; 431/4
See application file for complete search history.

(56) References Cited

U.S. PATENT DOCUMENTS 3,849,332 A * 11/1974 Bailey et al. ............... 502/423
3,966,634 A 6/1976 Sacks
4,243,489 A 1/1981 Green
2003/0027088 A1 * 2/2003 Ueno et al. ................ 431/4

FOREIGN PATENT DOCUMENTS

| JP | 04-278111 | 10/1992 |
| JP | 6-33064 | 2/1994 |
| JP | 09-152118 | 6/1997 |
| JP | 09-243031 | 9/1997 |
| JP | 11-63445 | 3/1999 |
| JP | 2000-193216 | 7/2000 |

* cited by examiner

*Primary Examiner*—N. Bhat
(74) *Attorney, Agent, or Firm*—Jordan and Hamburg LLP

(57) ABSTRACT

A smokeless porous carbon production method and its production system in which porous carbon is produced by heat treating a large amount of material, e.g. wood or bamboo, efficiently in a short time with thermal energy generated by combusting combustible gas produced by heating the material, without combusting the material completely by regulating inflow of air. The smokeless porous carbon production system comprises a sequential carbonization chamber (12) for heating a material M, e.g. wood or bamboo, charged in from a material charging opening from below to carbonize the material sequentially and to generate combustible gas, a high heat treatment chamber (13) disposed below the sequential carbonization chamber continuously thereto, a residual gas combustion chamber (16) communicating with the high heat treatment chamber through a lower opening, an exhaust pipe (17) disposed continuously to the residual gas combustion chamber while being directed upward, and means for taking out an intermediate carbide subjected to high heat treatment in the high heat treatment chamber to the outside of a furnace, wherein air regulation openings (15) for taking in an appropriate amount of outer air are provided in the outer walls of the high heat treatment chamber and the residual gas combustion chamber.

13 Claims, 7 Drawing Sheets

SMOKELESS POROUS CARBON PRODUCTION METHOD AND ITS PRODUCTION SYSTEM

TECHNICAL FIELD

The present invention relates to carbon, especially porous carbon excellent in adsorption and activity, claiming attention as a water purification substance and a minus-ion generating source in recent years. More particularly, the present invention relates to a smokeless porous carbon production method, its production system and porous carbon utilizing waste building material and waste branches resulting from trimming that have mainly been disposed of by incineration; requiring almost no energy cost but ensuring greater environmental and hygienic safety because of no dioxin generation; and contributing to the effective utilization of resources.

BACKGROUND ART

There are two kinds of charcoal: black charcoal and white charcoal. The black charcoal is produced by carbonizing Japanese oaks such as nara and kunugi in a charcoal kiln at 400-700° C. before being cooled in the kiln, whereas the white charcoal, especially Kinokuni bichoutan (charcoal), is produced by carbonizing Quercus Phillyraeoides (a kind of beech) in a charcoal kiln at 800-1000° C. before being rapidly cooling outside the kiln. The charcoal kiln above is a kind of kiln in which material is heated in the absence of air and the smoke produced during the combustion of wood is discharged directly outside. The smoke is a product resulting from the thermal decomposition of cellulose accounting for 75% of the ingredients of the wood and of lignin accounting for 20-25% thereof. On the other hand, though most of the wood-based waste materials such as waste building material are disposed of by incineration, dioxin is generated by directly combusting the waste wood-based material because chlorine synthetic resin may be intermingles with the waste material. Consequently, there arise a problem of atmospheric pollution when the combustible gas is discharged and another problem of disposing the ashes produced by incineration. In the conventional carbon production method above, moreover, it takes several days combusting the wood completely after the construction of the kiln is started and also takes a great deal of labor and time; the problem is that the production method is not fit for short-term mass production.

Further, a combustion furnace for directly combusting a material by a natural draft accompanied by partially gasified combustion is disclosed in JP-A-11-63445. As shown in FIG. 7, the combustion furnace described in JP-A-11-63445 mainly comprises an accumulated gas gasification chamber 51 having an upper opening, a first combustion chamber 52, a second combustion chamber 56 and an exhaust pipe 58. The combustion furnace attended with gasification combustion is provided with the accumulated gas gasification chamber 51 communicating with the first combustion chamber 52 having an ignition door 53 and a first air damper 54 in the lower portion in order to store an incineration material 59 and to convert part of the material 59 into combustible gas, and the second combustion chamber 56 communicating with the first combustion chamber 52 via a fire grate 55 and having the exhaust pipe 58 in the upper portion and a second air damper 57 in the lower portion. Although the combustion furnace above is capable of completely combusting the material so as to prevent the generation of a cloud of dust as well as an offensive smell, this system is basically different from a smokeless porous carbon production system according to the invention in that the former is characterized by completely combusting a material so as to reduce the material to ashes, whereas the latter is intended for porous carbon production. In other words, the material charging opening of the combustion furnace above is open and the material 59 is completely combusted and reduced to ashes because a large amount of air is introduced into the furnace from the charging opening and the dampers for combusting purposes. Moreover, the combustion furnace has no equipment for use in cooling or radiating heat of a carbide to be taken outside when the nature of an incinerator is considered.

DISCLOSURE OF THE INVENTION

Problems to be Solved by the Invention

The present inventors have earnestly made studies for years on combustion furnaces without generating toxic gas containing dioxin and so forth by completely combusting waste wood-based material such as waste building material. The present inventors have thereupon completed this invention as claimed in the application concerned by finding out that porous carbon entirely different from ordinary charcoal is made producible not by simply combusting the wood-based material but subjecting an initial carbide to high heat treatment by regulating inflow of air, by using thermal energy produced when combustible gas generated by heating the wood-based material is combusted and radiating the heat. Thus, the invention is entirely different from the simple combustion furnace or the combustion method as stated above and an object of the invention is provide a smokeless porous carbon production method and its production system in which porous carbon is produced by heat-treating a large amount of material such as wood or bamboo, efficiently in a short time without combusting the material completely by regulating inflow of air.

Means for Solving the Problems

In order to solve the foregoing problems by the invention, a smokeless porous carbon production method for producing porous carbon by subjecting a material, for example, wood or bamboo, to high heat treatment according to the invention is characterized by a series of steps including: a gasifying•carbonizing step to form an initial carbide by heating the material by regulating inflow of air so as to carbonize the material sequentially and to generate combustible gas; a high heat treatment step to form an intermediate carbide by combusting combustible gas by regulating inflow of air so as to subject the initial carbide to high heat treatment; and a step to take out the intermediate carbide subjected to the high heat treatment to the outside of a furnace, wherein part of the thermal energy generated by completely combusting the combustible gas at the high heat treatment step is used as a heat source, the combustible gas being generated at the gasifying-carbonizing step over the series of steps as mentioned above, so that the continuous operation of a smokeless porous carbon production system is made possible by using only the energy within the system after the operation is started.

In order to solve the foregoing problems by the invention, further, the smokeless porous carbon production method according to the invention is preferably such that dioxin and visible soot and smoke are prevented from being discharged outside the system by completely combusting the combustible gas while the treatment temperature during the steady operation at the high heat treatment step is maintained at 1200-1400° C. and that the intermediate carbide is made intensely porous by the high heat treatment.

In order to solve the foregoing problems by the invention, a smokeless porous carbon production system preferably comprises: a sequential carbonization chamber for heating a material, for example, wood or bamboo, charged in from a material charging opening from below to carbonize the material sequentially and to generate combustible gas; a high heat treatment chamber disposed below the sequential carbonization chamber continuously thereto; a residual gas combustion chamber communicating with the high heat treatment chamber through a lower opening; an exhaust pipe disposed continuously to the residual gas combustion chamber while being directed upward; and means for taking out an intermediate carbide subjected to high heat treatment in the high heat treatment chamber to the outside of a furnace, wherein air regulation openings for taking in an appropriate amount of air are provided in the outer walls of the high heat treatment chamber and the residual gas combustion chamber.

In order to solve the foregoing problems by the invention, further, the smokeless porous carbon production system is preferably such that with exhaust gas discharged from the exhaust pipe, a negative pressure condition prevails in the furnace and an appropriate amount of air is taken in from the air regulation openings so that gas such as the combustible gas is caused to flow through the sequential carbonization chamber, the residual gas combustion chamber and the exhaust pipe continuously in this order and then into the atmosphere.

In order to solve the foregoing problems by the invention, further, the smokeless porous carbon production system is preferably such that the combustible gas generated in the sequential carbonization chamber proceeds downward and completely combusted in the high heat treatment chamber and the residual gas combustion chamber, so that the generation of dioxin and visible soot and smoke is suppressed as much as possible, whereby clean exhaust gas is discharged outside from the exhaust pipe via a cyclone.

In order to solve the foregoing problems by the invention, further, the smokeless porous carbon production system is preferably such that with a smoke sensor and a smoke consuming blower additionally installed within the exhaust pipe, an amount of air to be taken in the furnace is increasably regulated so as to completely combust the exhaust gas by interlocking the air regulation openings or the smoke consuming blower with the movement of the smoke sensor when visible soot and smoke are generated, so that the visible soot and smoke are prevented from being discharged outside from the exhaust pipe.

In order to solve the foregoing problems by the invention, further, the smokeless porous carbon production system is preferably such that the sequential carbonization chamber is arranged so that its upper side is wide and tapered toward its lower side; the side wall of the high heat treatment chamber coupled to the lowermost portion of the sequential carbonization chamber is formed perpendicularly; and the material or the initial carbide is stroked by causing stroking levers to make appearances or disappearances, the stroking levers being slidably provided horizontally near the lower portion of the sequential carbonization chamber, whereby to allow the contents to readily drop by their own weight.

In order to solve the foregoing problems by the invention, further, the smokeless porous carbon production system is preferably such that heat resistant material is used for high heat receiving portions such as the high heat treatment chamber, the residual gas combustion chamber and the like; a cooling water tank is mounted to the wall portion of the furnace and cooling water is circulated so as to insulate the exterior of the system against high heat within the furnace.

In order to solve the forgoing problems by the invention, further, the smokeless porous carbon production system is preferably such that a burner with an air blower, directed toward the inside of the residual gas combustion chamber is additionally installed; the burner is operated first when the system operation is started so as to cause the flow of gas accompanied with an ascending air current; and the system operation is started by setting fire to the material within the high heat treatment chamber.

In order to solve the forgoing problems by the invention, further, the smokeless porous carbon production system is preferably such that a guide chute for guiding the intermediate carbide to a carbon container via a fire grate is provided below the high heat treatment chamber; the intermediate carbide successively drops by its own weight onto the guide chute; and the intermediate carbide fallen onto the guide chute is moved by conveying means so as to contain the intermediate carbide in the carbon container.

In order to solve the forgoing problems by the invention, further, the smokeless porous carbon production system is preferably such that the conveying means is a vibrating conveyor or a screw-type conveyor.

In order to solve the foregoing problems by the invention, further, the smokeless porous carbon production system is preferably such that the whole or part of the guide chute is covered with cooling means so as to rapidly cool the intermediate carbide.

In order to solve the forgoing problems by the invention, further, the smokeless porous carbon production system is preferably such that the carbon container is provided in a carbon container storage chamber positioned in the surface of the earth in a buried condition and that the carbon container is installed such that it can be taken in and out via an open-and-close cover capable of opening and closing for sealing purposes.

In order to solve the forgoing problems by the invention, further, the smokeless porous carbon production system is preferably such that the carbon container has the open-and-close cover capable of opening and closing for sealing purposes and that the open-and-close cover of the carbon container is left open while the porous carbon is being fed into the carbon container with the open-and-close cover of the carbon container storage chamber closed and when the porous carbon is completely accommodated in the carbon container, the open-and-close cover of the carbon container is closed whereby to take out the carbon container by opening the open-and-close cover of the carbon container storage chamber.

MODE FOR CARRYING OUT THE INVENTION

Figure 1:
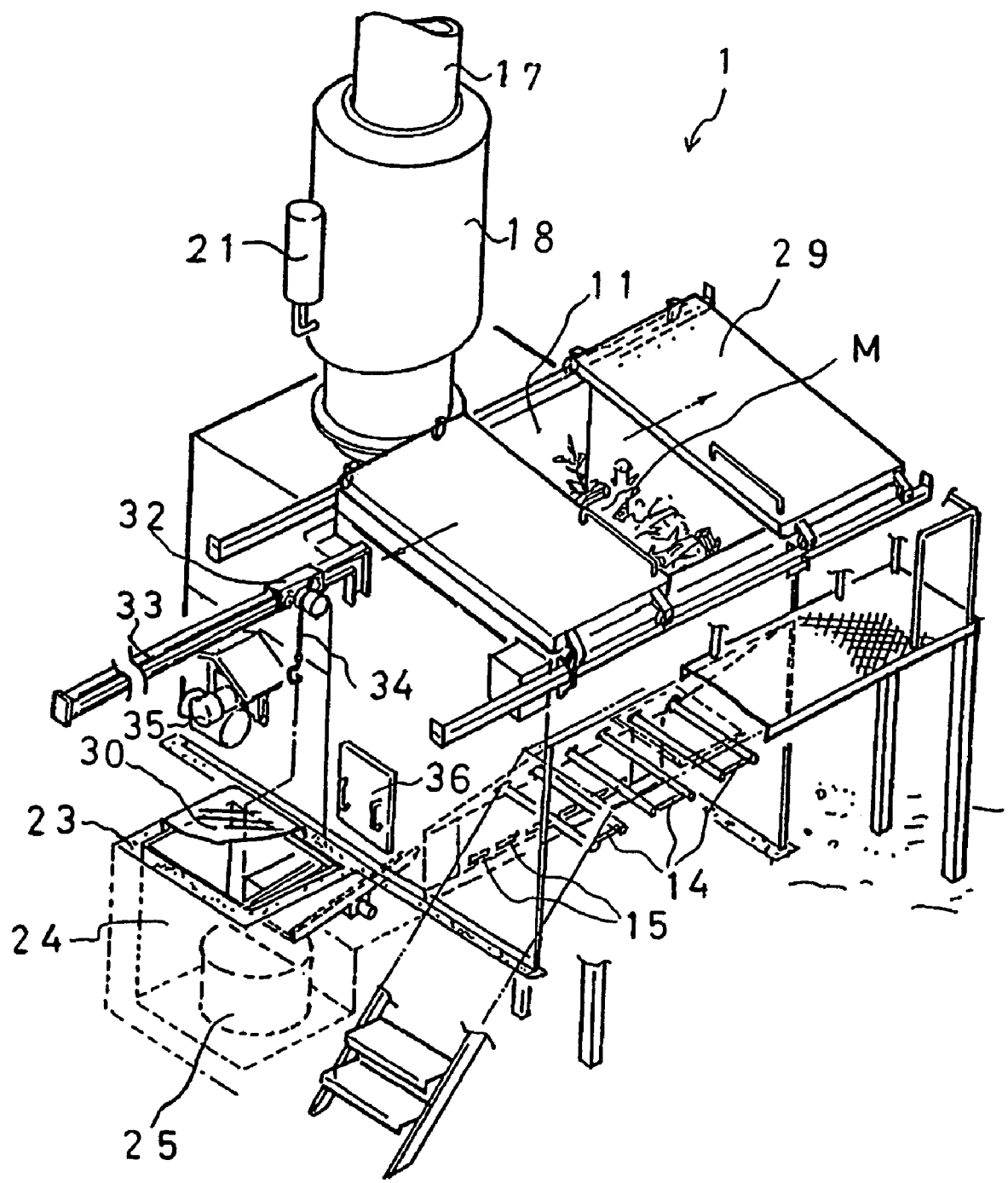
FIG. 1 is a perspective view of an exemplary smokeless porous carbon production system embodying the invention.
Figure 2:
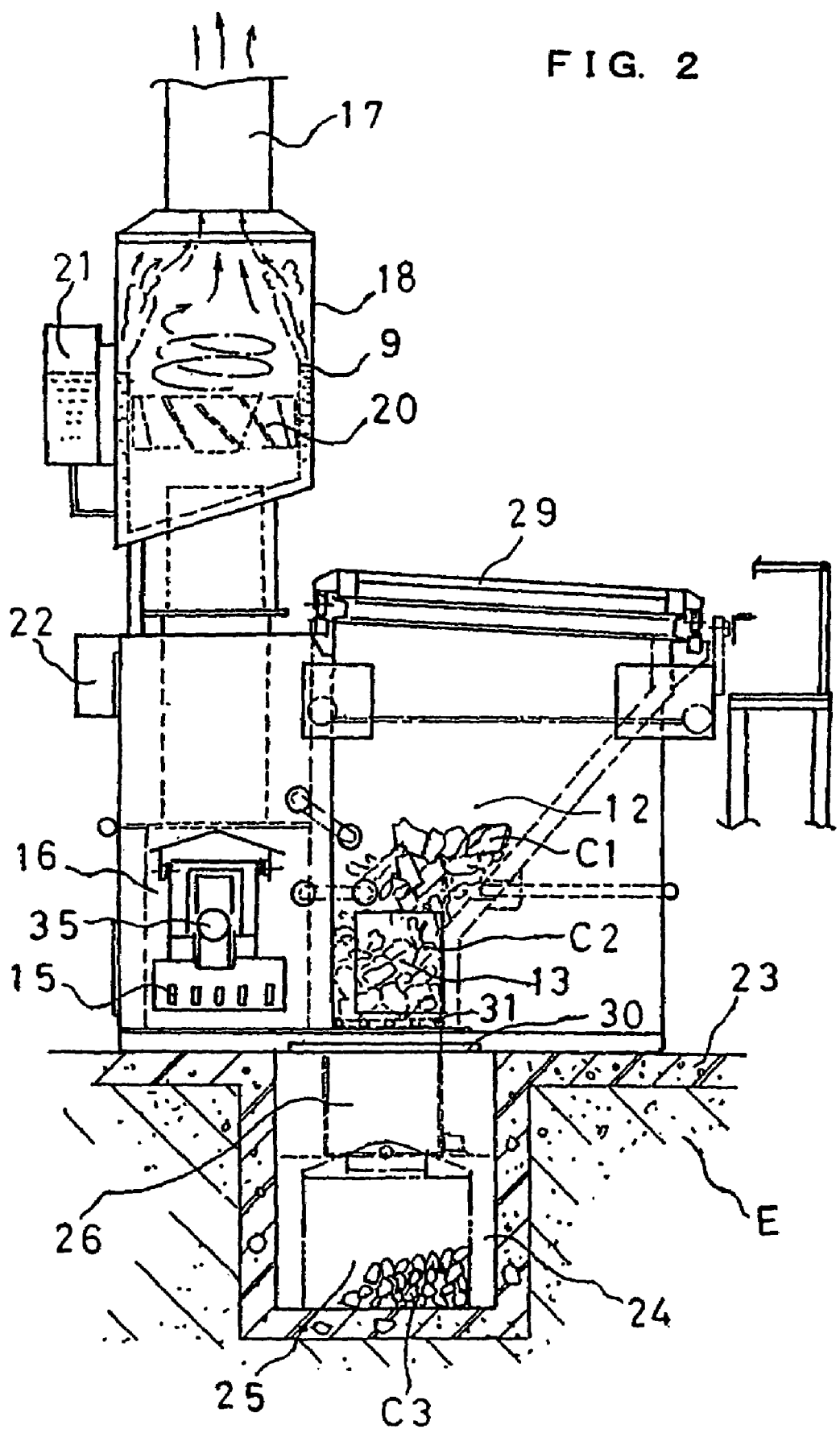
FIG. 2 is a partial sectional view of the exemplary smokeless porous carbon production system according to the embodiment of the invention.

An embodiment of the invention will now be described. Material for use in a porous carbon production method embodying the invention is mainly wood or bamboo; however, it is not limited to wood and bamboo but may be any kind of material carbonizable by heat treatment. It has great merit to effectively utilize waste building material and waste branch material resulting from trimming as porous carbon; these waste materials have heretofore been disposed of by incineration. Moreover, the trouble of preprocessing material like waste building material is saved as the material can be charged in from a material charging opening without being especially crushed or broken on condition that the material is so sized as to be directly charged in therefrom.

At the gasifying•carbonizing step in the porous carbon production method, which is similar to the process of drying wood by distillation in the conventional charcoal production method, an initial carbide is formed by heating the material in the absence of air while regulating inflow of air so as to sequentially carbonize the material and to generate combustible gas. Although the combustible gas is discharged as smoke into the atmosphere in the case of a charcoal kiln, the combustible gas is a product resulting from the thermal decomposition of cellulose accounting for 75% of the ingredients of the wood and of lignin accounting for 20-25% thereof and both cellulose and lignin contain ingredients including carbon, hydrogen and oxygen. The combustible gas is subjected to thermal decomposition and utilized as fuel that generates an intense heat so as to save energy and to restrain toxic substances such as visible soot and smoke as well as dioxin from being discharged into the atmosphere.

With the high heat treatment at the next step, the initial carbide obtained at the preceding step is subjected to the high heat treatment by combusting the combustible gas by regulating inflow of air to generate an intermediate carbide. In this case, combusting the combustible gas while regulating inflow of air is intended to prevent the initial carbide from becoming completely combusted before being reduced to porous material in case that the initial carbide is combusted with the excessive supply of oxygen provided as in the conventional incinerator. The high heat generated by combusting the combustible gas by regulating inflow of air causes carbon in the initial carbide and oxygen to react together, which results in discharging carbon dioxide and carbon monoxide, and the wood vinegar component of the initial carbide is subjected to the thermal decomposition before being discharged as gas and extremely small holes appear in the spots where the discharges have occurred, whereby the initial carbide is considered reducible to porous material having an adsorptive action. The conditions of the high heat treatment vary with the capacity of a furnace and the kind of material for use and the heat treatment may be given for 1.5 to 2 hours at about 1200-1400° C., preferably 1300-1350° C. The intermediate carbide subjected to the high heat treatment undergoes self-heat-radiation or is forcibly cooled and taken out of the furnace, so that porous carbon is obtainable.

A smokeless porous carbon production system embodying the invention will now be described by reference to the drawings. FIGS. 1-6 illustrate the smokeless porous carbon production system according to the embodiment of the invention. FIG. 1 shows the smokeless porous carbon production system according to the embodiment of the invention, wherein reference numeral 11 denotes a material charging opening; 12, a sequential carbonization chamber; 13, a high heat treatment chamber; 14, stroking levers; 15, air regulation openings; 16, a residual gas combustion chamber; 17, an exhaust pipe; 18, a cyclone; 19, a water-cooled wall; 20, a rotary cyclone wing; 21 and 22, water supply tanks; 23, a concrete base; 24, a carbon container storage chamber; 25, a carbon container; 26, a guide chute; 27, a vibrating conveying means; 28, a screw-type conveying means; 29 and 30, open-and-close covers; 31, a fire grate; 32, a lifting gear; 33, a lifting conveying rail; 34, a wire; 35, a stabilizing burner; 36, an ignition door; 37, a smoke sensor; 38, a smoke consuming blower; and 39, a smoke detection control board. Further, reference symbol M denotes a material; C1, an initial carbide; C2, an intermediate carbide; C3, porous carbon; and E, the surface of the earth.

The smokeless porous carbon production system 1 according to the embodiment of the invention comprises: a chamber 12 for heating a material M such as wood or bamboo charged in from a material charging opening 11 from below to carbonize the material sequentially and to generate combustible gas, a high heat treatment chamber 13 disposed below the sequential carbonization chamber 12 continuously thereto, a residual gas combustion chamber 16 communicating with the high heat treatment chamber 13 through a lower opening, an exhaust pipe 17 disposed continuously to the residual gas combustion chamber 16 while being directed upward, and a means for taking out the intermediate carbide subjected to high heat treatment in the high heat treatment chamber 13 to the outside of a furnace. With respect to the inner wall of the furnace, the high heat treatment chamber 13 and part of the residual gas combustion chamber 16 are protected by heat-resistant bricks and by circulating cooling water from a cooling water tank around the wall portion of the furnace, a guide chute, an exhaust pipe and the like, the furnace is heat-insulated to the outside so as to guarantee the safety of the worker by protecting him/her from a burn.

In the porous carbon production system 1, the material charging opening 11 is provided with an open-and-close cover 29 as shown in FIG. 1 and an amount of air flowing into the high heat treatment chamber 13 or the residual gas combustion chamber 16 can be regulated by closing the open-and-close cover 29 after the material M is charged in from the material charging opening 11 and by opening or closing air regulation openings 15 provided in the outer walls of the high heat treatment chamber 13 and the residual gas combustion chamber 16. The plurality of air regulation openings 15 are provided in the side walls of the high heat treatment chamber 13 and the residual gas combustion chamber 16 and made adjustable by varying the open area of each opening after a sliding fashion. While the condition of smoke let out of the exhaust pipe 17 is being observed, an inflow of air can be regulated by operating a slide-type opening regulator. When a large amount of air is needed at the starting time, for example, an inflow of air can be increased by opening an ignition door. After steady operation is commenced, the amount of air is substantially kept constant and it is almost unnecessary to follow the above step of increasing the amount of air. On receiving heat from the high heat treatment chamber 13, the material M charged in from the material charging opening 11 is successively carbonized in the sequential carbonization chamber 12 in an ascending order starting from what is situated on the lowest side while the material is generating the combustible gas. Then the material successively drops by its own weight into the lower-side high heat treatment chamber 13 in which it is subjected to high heat treatment.

Figure 6:
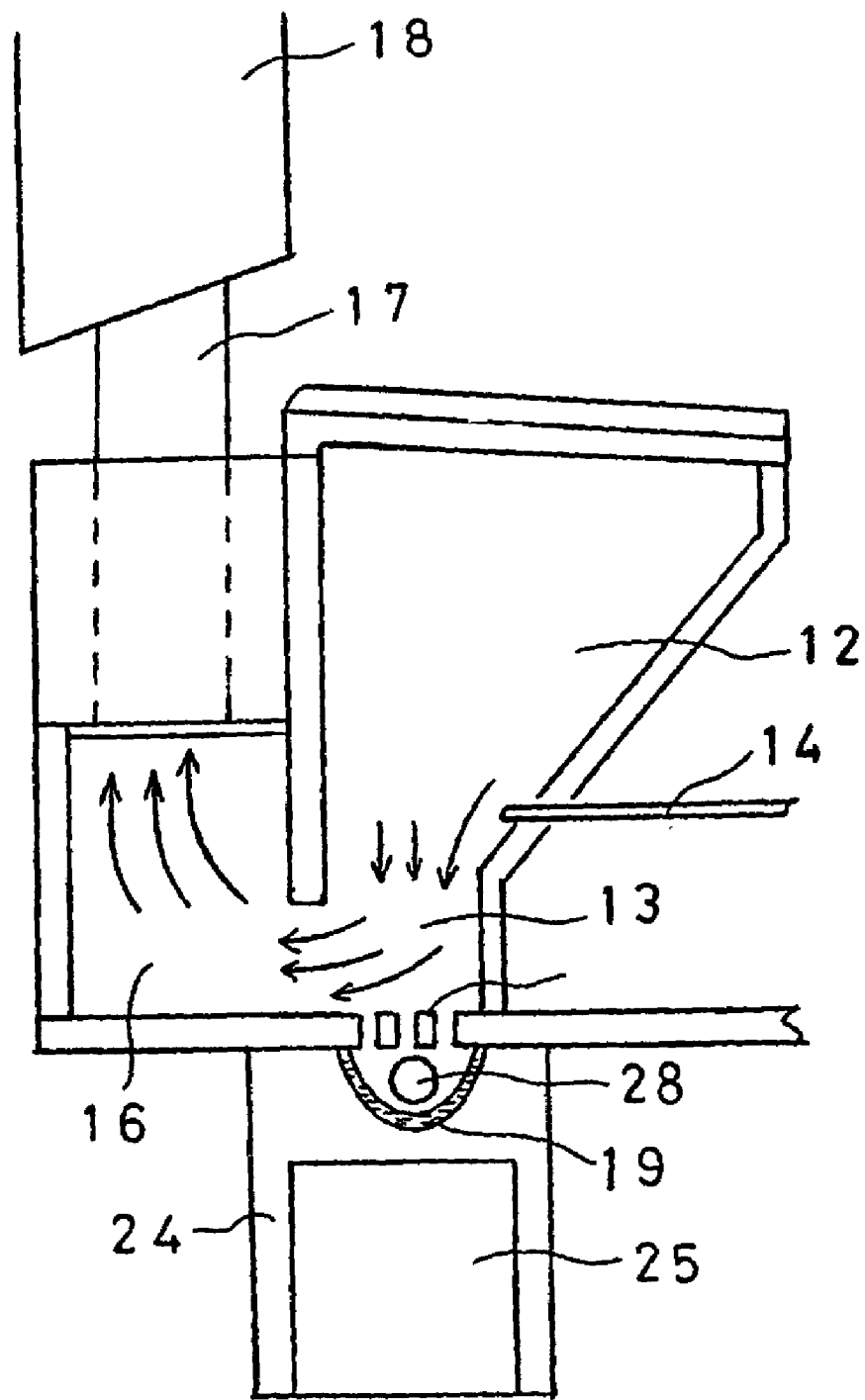
FIG. 6 is a diagram illustrating the exemplary smokeless porous carbon production system wherein a guide chute is provided with a cooling means.
Figure 7:
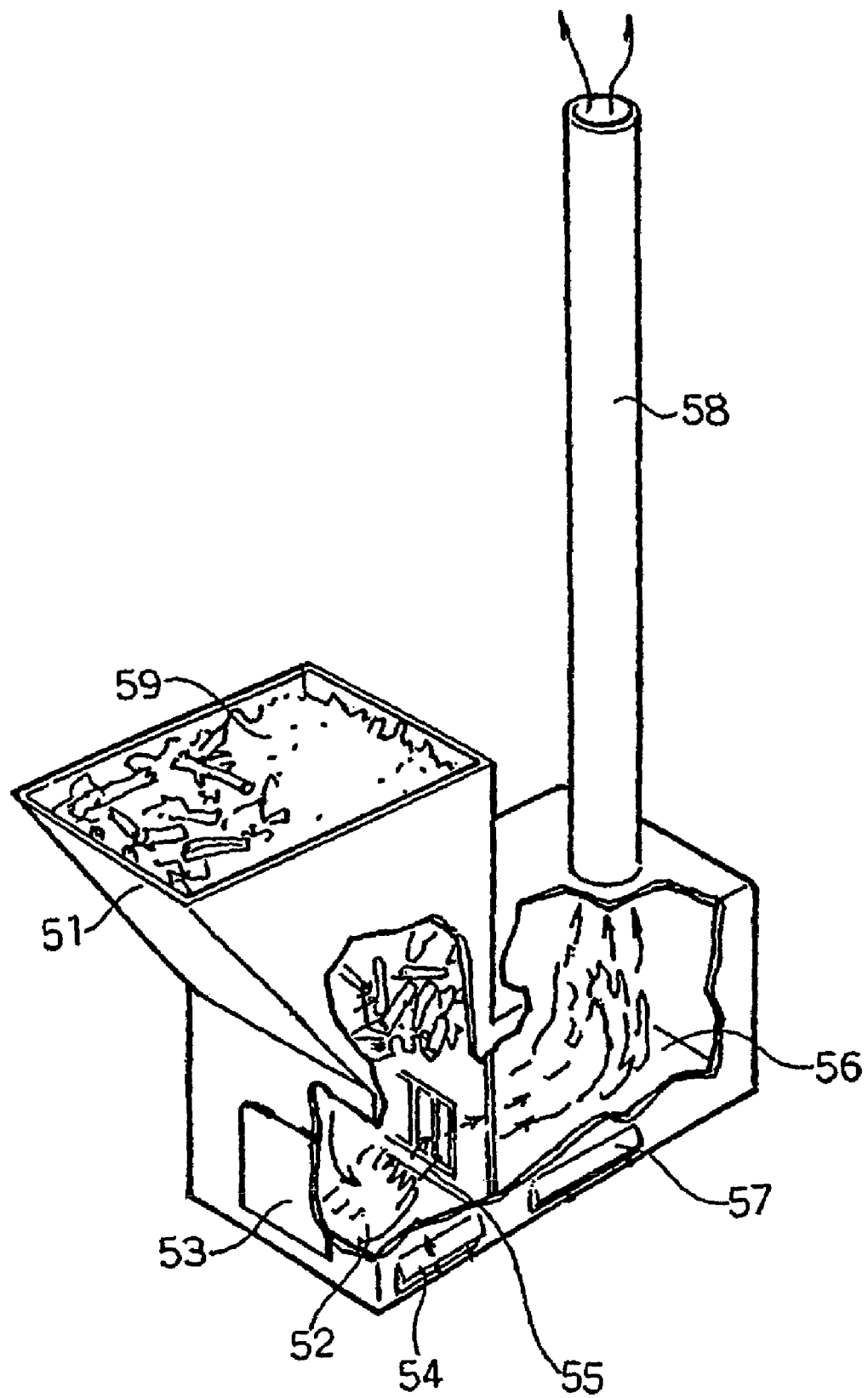
FIG. 7 is a diagram illustrating an incinerator under the conventional system.

At this time, it is desirable to have the initial carbide readily dropped by moving back and forth a plurality of stroking levers 14 horizontally provided near the lower portion of the sequential carbonization chamber so as to stroke the initial carbide. Each of the stroking levers 14 is substantially U-shaped and the plurality of stroking levers are provided laterally, some of which are successively moved longitudinally. On the other hand, the combustible gas generated by heating the material M in the sequential carbonization chamber 12 is attracted by an ascending air current in the exhaust pipe 17 communicating with the sequential carbonization chamber 12 and proceeds in the direction of an arrow. Immediately after the combustible gas enters the high heat treatment chamber 13, moreover, it undergoes the thermal decomposition and generates high heat as shown in FIG. 6 and the residual gas is then introduced into the residual gas combustion chamber 16 before being completely subjected to the thermal decomposition. Thus, the continuous system operation is made possible by only using the energy within the system after the system operation is started and as no fuel or power is used except that a stabilizing burner 35 is employed at the starting time, the running costs become greatly reducible.

Figure 3:
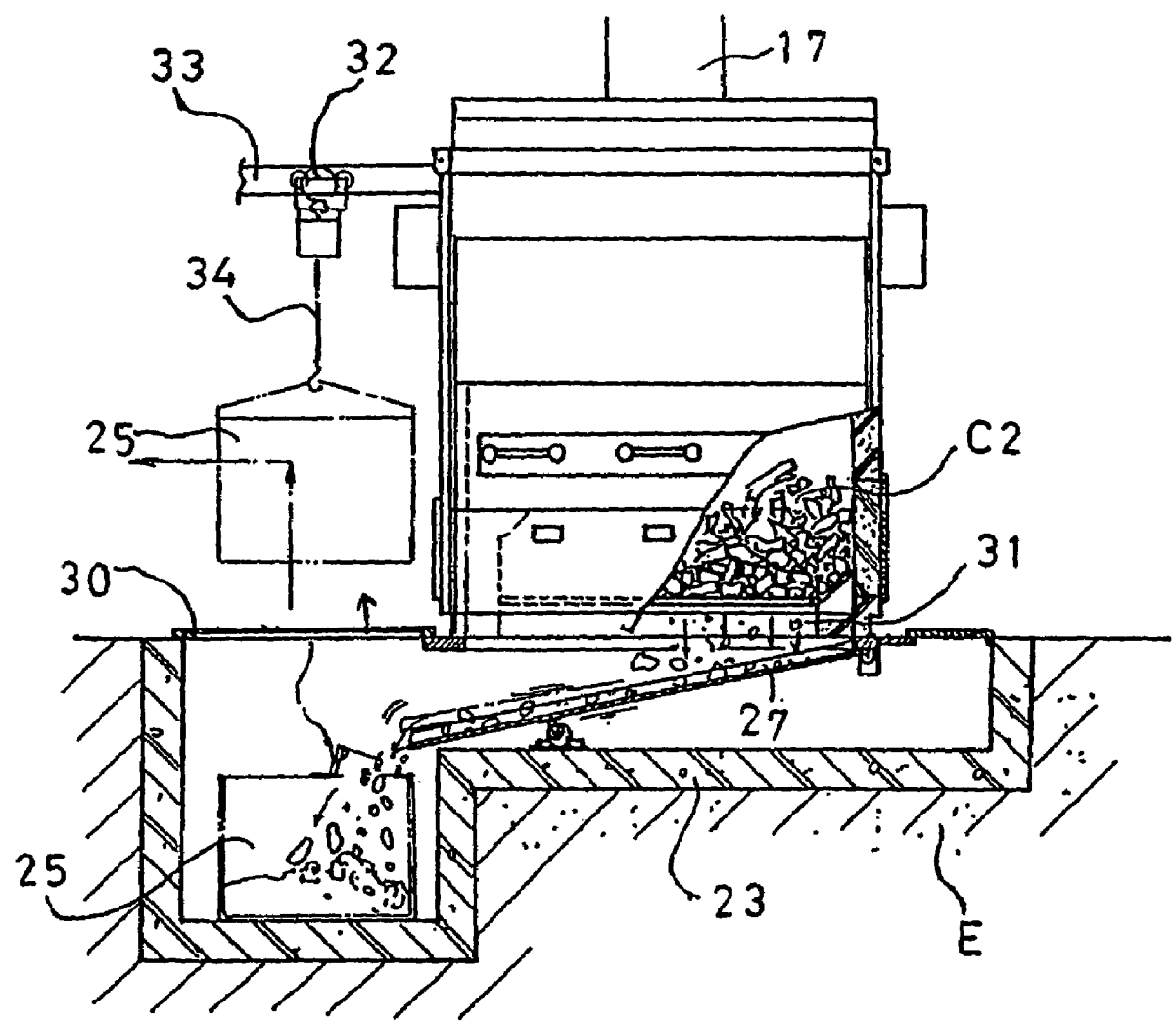
FIG. 3 is a partial sectional view of the exemplary smokeless porous carbon production system according to the embodiment of the invention.
Figure 4:
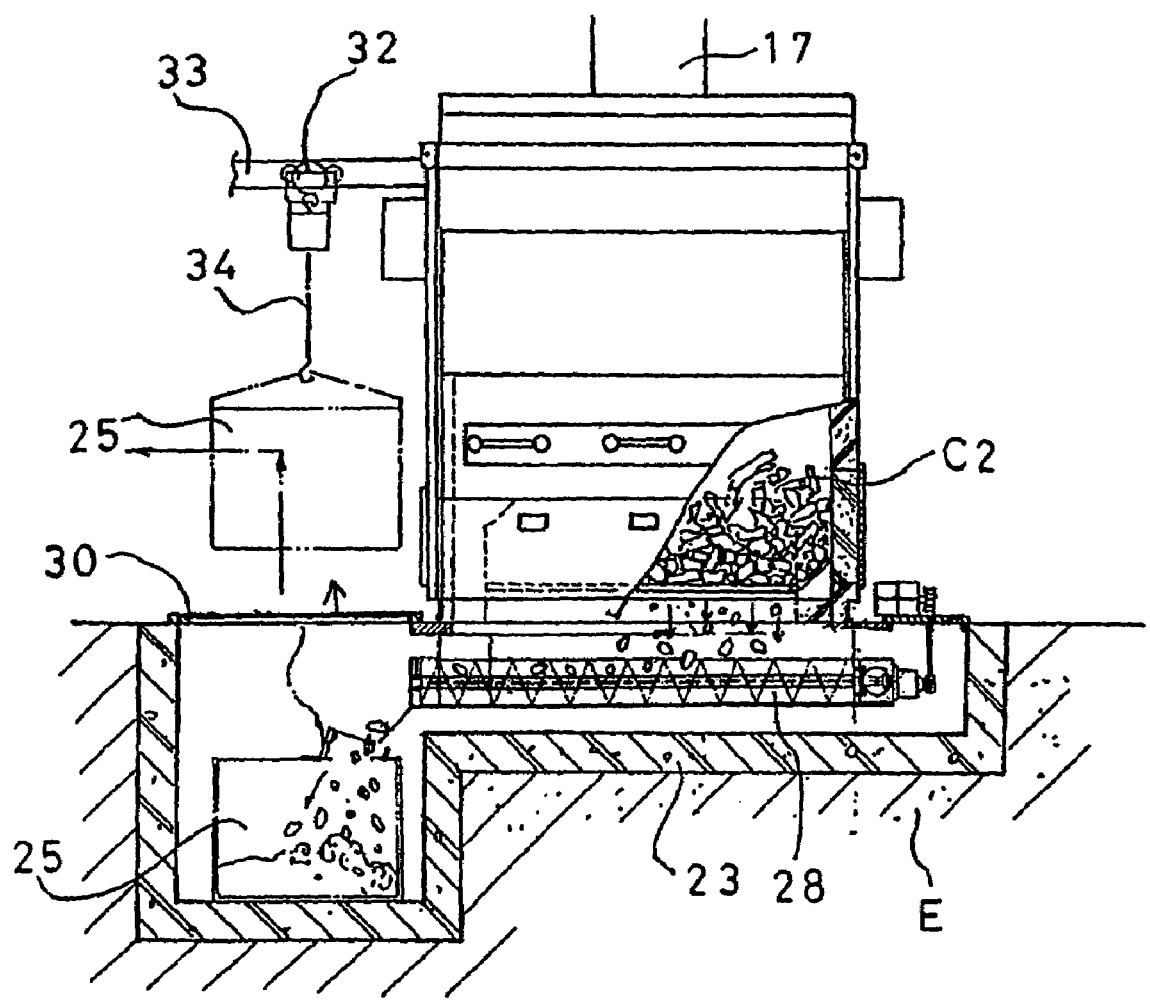
FIG. 4 is a partial sectional view of the exemplary smokeless porous carbon production system according to the embodiment of the invention.

In this porous carbon production system 1, the high heat generated in the high heat treatment chamber 13 and the residual gas combustion chamber 16 is abated by the water supplied and the combustion gas is discharged via a cyclone having a cyclone wing. Further, a fire grate 31 having an appropriate grid is provided like a bridge in the low-floor portion of the high heat treatment chamber 13 and a guide chute 26 is provided below the high heat treatment chamber 13 via the fire grate 31. Any lattice size may be set according to the material size. The intermediate carbide fallen onto the guide chute 26 is arranged so as to be successively accommodated in a carbon container 25 via a vibrating conveying means 27 such as a vibrator as shown in FIG. 3 or a screw-type conveying means 28 as shown in FIG. 4, whereby porous carbon is obtained as the intermediate carbide spontaneously radiates heat. As shown in FIG. 6, further, porous carbon rich in crystallizability is also made obtainable by covering the whole or part of the guide chute 26 with a water-cooled wall 19 through which a refrigerant such as cooling water is circulated so as to rapidly cool the intermediate carbide.

The carbon container 25 can be opened and closed by an open-and-close cover 30 and a concrete base 23 is provided in the surface of the earth E in a buried condition, whereupon the carbon container 25 is accommodated in a carbon container storage chamber 24 provided in the concrete base 23. The carbon container 25 is formed so that it is extractible to the outside via the open-and-close cover 30. Then the inside of the carbon container storage chamber 24 is kept in such a state that insufficient oxygen is present when the open-and-close cover 30 is shut tight. The open-and-close cover of the carbon container 25 is closed at a point of time the carbon container 25 is filled up with porous carbon. Then the open-and-close cover 30 provided for the carbon container storage chamber 24 is opened and a lifting gear 32 attached to a lifting conveying rail 33 is operated whereby to move the carbon container 25 latched to the tip of a wire 34 to a predetermined position.

Figure 5:
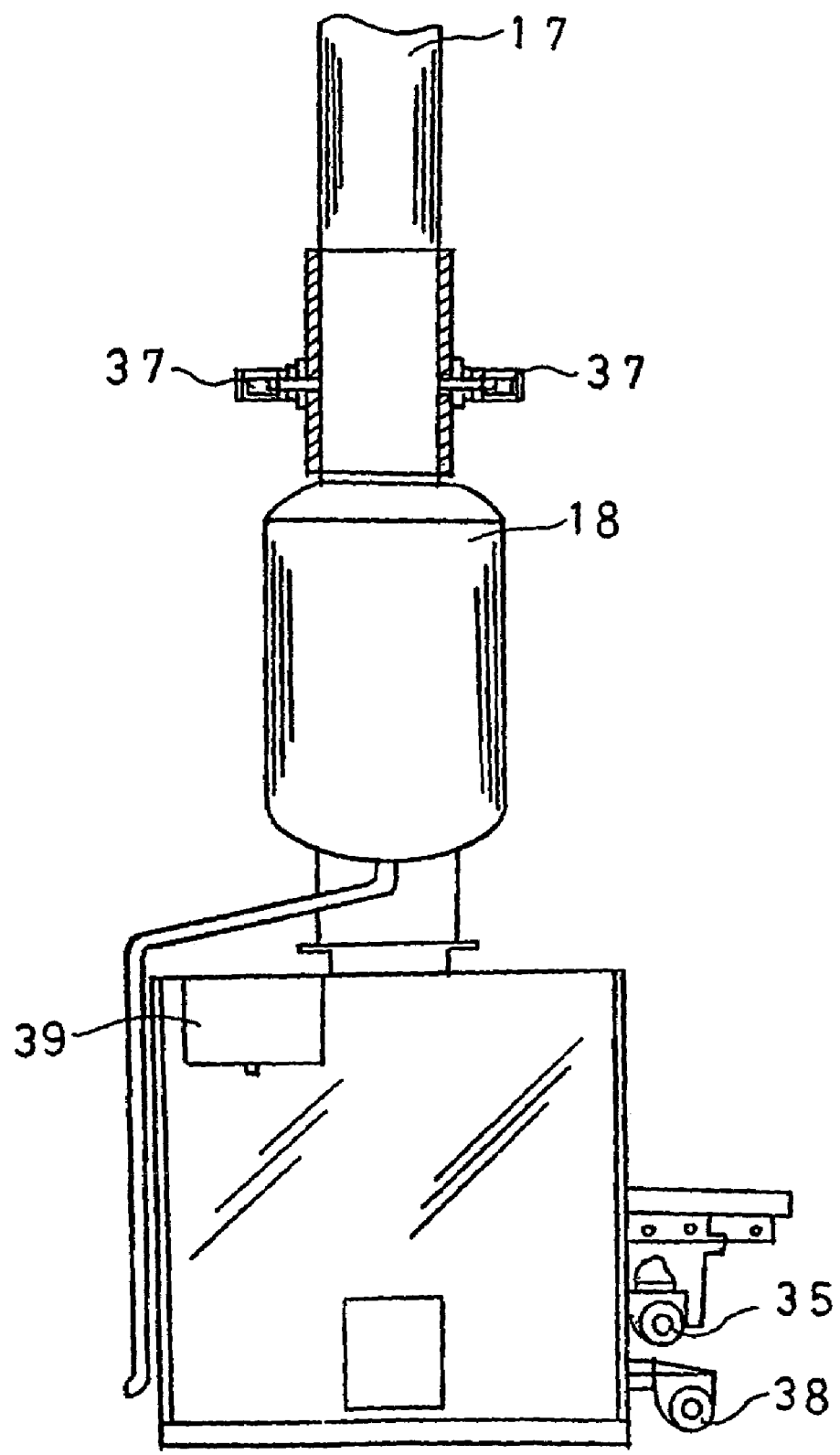
FIG. 5 is a rear view of the exemplary smokeless porous carbon production system with a smoke sensor and a smoke consuming blower additionally installed according to the embodiment of the invention.

Since the generated gas is completely combusted as described above, no visible soot and smoke are generated during the steady operation of the smokeless porous carbon production system according to the invention. However, on the assumption that the visible soot and smoke are generated because of abnormal combustion when the material is charged in or in case where the initial carbide rapidly drops from the sequential carbonization chamber 12 into the high heat treatment chamber 13, a smoke sensor 37, a smoke consuming blower 38 and a smoke detection control board 39 are provided as adjuncts or accessories as shown in FIG. 5. Accordingly, it is desirable to take all possible measures including sounding a buzzer to notify the generation of soot and smoke and automatically adjusting a take-in amount of air upward by making an air adjusting port wide open or operating the smoke consuming blower 38 whereby to prevent the discharge of such visible soot and smoke outside from the exhaust pipe.

Working Example

A working example of the invention will now be described. Although waste framing material of concrete was used in this working example, the invention is not limited to waste building material but may make utilizable other wood-based materials such as wood, bamboo and so forth usable for producing porous carbon. Moreover, the invention purports to include a wide range of extracting means other than a guide chute, a screw-type conveyor or a vibrating conveyor as means for extracting the intermediate carbide outside. Examples of experiments made to produce porous carbon with the waste framing material of concrete as raw material by using the smokeless porous carbon production system (actually installed in Matsudo City, Chiba Prefecture, Japan) according to the embodiment of the invention as mentioned above will be described hereinbelow. First, the waste framing material was cut into pieces about 1 to 2 meters in length and breadth and successively charged in from the sequential carbonization chamber 12 and the high heat treatment chamber 13 so as to fill these chambers therewith. In order to secure air-permeability and facilitate the spontaneous dropping of the initial carbide, a waste material to be filled in was preferably 5 to 6 $m^3$ as the capacity of the sequential carbonization chamber 12 was about 7 $m^3$.

On the termination of the charging of the waste material in, the stabilizing burner 35 was lighted and a flame was blown by the blower toward the residual gas combustion chamber. The ascending air current directed to the exhaust pipe 17 was produced after the flame blowing operation continued for about 5 to 10 minutes and then a convection current occurred. At this time, an ignition material (made by impregnating waste wooden chips with kerosene) was used to set fire to the waste material through the ignition door in the side wall of the high heat treatment chamber 13. Then the operation of the stabilizing burner 35 was stopped after complete combustion was confirmed by the condition of smoke extraction.

The temperature of the carbide in the high heat treatment chamber 13 about 30 minutes after fire was set to the waste material reached about 1350° C. The temperature of the sequential carbonization chamber 12 gradually rose toward the high heat treatment chamber 13 from the side of the material charging opening 11. While the open-and-close cover 29 of the material charging opening 11 was kept closed, the inside of the sequential carbonization chamber 12 remained in such a state that insufficient oxygen was present, so that heating in the absence-of-air condition was maintained with the fire extinguished therein because a convection current of combustible gas directed downward occurred, which results in the restriction of air inflow as shown in FIG. 6. Further, air flowed into the chamber under negative pressure from the air regulation openings 15 in the side wall of the high heat treatment chamber 13 was mixed with the combustible gas from the sequential carbonization chamber 12, whereby the mixture underwent thermal decomposition and generated high heat.

The fire grate 31 according to this working example had four lines and 12 rows of strips of metal, thus forming a grating about 90-110 mm long and about 120 mm wide like a bridge in a manner substantially covering the whole guide chute. About one to one and a half hours after setting fire to the waste material, the intermediate carbide was dropped onto the guide chute 26 via the fire grate 31 and successively accommodated in the carbon container 25. According to this working example, a waste material of about 5-6 $m^3$ was heat-treated in a little less than about two hours and about one 500 L containerful of carbon was recovered. As shown in FIG. 6, the lower portion of the guide chute 26 was rapidly cooled with the water-cooled wall 19 and the temperature of the porous carbon immediately after the recovery of the carbon lowered until its surface turned black according to this working example but it took about 10 to 20 hours further until the temperature of the porous carbon within the carbon container 25 lowered to normal temperature by natural heat radiation. However, continuous system operation was made possible by sequentially charging the waste material in and in case that the system was continuously operated for 24 hours per day, porous carbon of about 6 $m^3$ was made obtainable by processing a waste material of 60-70 $m^3$.

A description will subsequently be given of analytical experiments (1) on the porous carbon according to the working example above and (2) on exhaust gas during the operation of the smokeless porous carbon production system according to the invention, made at the Fisheries Department of Kagoshima University.

(1) Analytical Experiments at Fisheries Department of Kagoshima University:

By preparing materials deriving from porous carbon obtained according to the experimental example, bichoutan charcoal and activated carbon of palm shells by adjusting the materials to 4 mm in size, gaseous and liquid phase experiments were conducted with the following test methods:

1) Particle size, hardness, specific surface area and air moisture adsorptivity.

According to K1470 of Japanese Industrial Standards (hereinafter called JIS) and k113-1974 of Japan Water Works Association Standards (hereinafter called JWWA).

2) Ammonia Adsorptivity.

Each material and ammonia were sealed up on a microdiffusion culture plate and the ammonia before and after adsorption was analyzed by a Technicon Traccs 2000 autoanalyzer.

3) Formalin Adsorptivity.

Each material and formalin were sealed up and the hormalin was analyzed by the iodometry method.

The results of analysis may be summarized as follows.

As the moisture adsorption ability of the porous carbon of the invention is extremely high though the moisture adsorption ability does not appear in the specific surface area, the porous carbon of the invention is evaluated as being highly porous. Further, the ammonia adsorption ability of the porous carbon of the invention is considerably greater than that of Bichoutan charcoal and the formaldehyde adsorption ability thereof has also been evaluated as being superior to the others. Further, according to reports on the results of specific surface area measurements by the BET1 point method in the Chemical Evaluation and Research Institute, Japan (dated Oct. 30, 2000), the porous carbon of the invention was reported to be 271 $m^2/g$ in comparison with 1.91 $m^2/g$ of the specific surface area of Bichoutan charcoal in general.

(2) Analytical Experiments on Exhaust Gas Discharged During the Operation of the Smokeless Porous Carbon Production System According to the Invention.

Analytical experiments on exhaust gas discharged during the operation of the smokeless porous carbon production system according to the invention were conducted at Environmental Control Center Co., Ltd. on Jul. 18, 2000. Objects for measurement were polychlorinated dibenzo-para-dioxins, polychlorinated dibenzofurans and coplanar polychlorinated biphenyls. Measuring methods included JIS K-0311; a method for measuring dioxins and coplanar PCB in exhaust gas, and a gas chromatographymass analysis method. The examination result revealed that the total amount of dioxins was 0.33 ng–TEQ/$m^3$N. Incidentally, the amount of dioxins in the exhaust gas from the combusting furnace is provided for in the Law on Special Measures for Countering Dioxins (enforced on Jan. 15, 2000) and the very amount was extremely lower than even 5 ng–TEQ/$m^3$N as a standard for less than 50 kg/h–2t/h of new facilities and it was ascertained that there was not posed any serious problem concerning atmospheric pollution.

EFFECT OF THE INVENTION

As the smokeless porous carbon production method and its production system are arranged as set forth above, the following effects are achievable.

1) As waste building material and waste branch material resulting from trimming and the like that have heretofore been disposed of by incineration in combusting furnaces can be utilized as porous carbon, this can not only save the trouble required to dispose of ashes produced by incineration as in the past as well as dispensing with dumping sites but also make feasible the effective utilization of terrestrial resources.

2) As no energy or power outside the system is used except that heating by the stabilizing burner is employed at the starting time, the running costs are extremely low. Moreover, emission of carbon dioxide gas into the atmosphere is greatly reducible and greater environmental and hygienic safety is ensured because the discharge of visible soot and smoke as well as dioxin is restrained.

3) A large amount of porous carbon is made producible by heat-treating a large amount of woody material with compact equipment in a short time and in comparison with the production of charcoal by means of the conventional charcoal kiln, time and labor as well as place can greatly be saved.

4) The quality of porous carbon to be produced can be uniformized with an improvement in yield by heat-treating the material by regulating inflow of air using the air regulation openings with the material charging opening closed.

5) With the system allowing porous carbon to be automatically conveyed to and accommodated in the carbon container by the guide chute and the vibrating or the screw-type conveying means according to the embodiment of the invention, the trouble of manually taking out the porous carbon is saved to ensure uniformization of quality.

6) Porous carbon rich in crystallizability is also made obtainable by covering the whole or part of the guide chute with a heat exchange means so as to rapidly cool the intermediate carbide.

7) The seal-up type carbon container is accommodated in the carbon container storage chamber provided with the open-and-close cover and positioned in the surface of the earth in a buried condition, so that the yield of porous carbon can be improved with the oxidation thereof prevented.

8) With the smoke sensor and the smoke consuming blower additionally installed within the exhaust pipe, an amount of air to be taken in the furnace is increasably regulated so as to completely combust the exhaust gas by interlocking the air regulation openings or the smoke consuming blower with the movement of the smoke sensor when visible soot and smoke are generated, so that the visible soot and smoke are prevented from being discharged outside from the exhaust pipe. Thus, atmospheric pollution is prevented as much as possible whereby to improve safety performance.

9) The cooling water tank is mounted to the wall portion of the furnace and cooling water is circulated to insulate the exterior of the system against high heat within the furnace, where by the furnace is protected from high heat so as to guarantee the safety of the worker by protecting him/her from a burn.

10) The stroking levers are slidably provided horizontally near the lower portion of the sequential carbonization chamber, whereby to allow the initial carbide to be readily dropped, which facilitates the heat treatment and improves the yield of porous carbon.

The invention claimed is:

1. A smokeless porous carbon production system comprising: a sequential carbonization chamber for heating a material charged in from a material charging opening from below to carbonize the material sequentially and to generate combustible gas; a high heat treatment chamber disposed below the sequential carbonization chamber continuously thereto; a residual gas combustion chamber communicating with the high heat treatment chamber through a lower opening; an exhaust pipe disposed continuously to the residual gas combustion chamber while being directed upward; and means for taking out an intermediate carbide subjected to high heat treatment in the high heat treatment chamber to the outside of a furnace, wherein air regulation openings for taking in an appropriate amount of air are provided in outer walls of the high heat treatment chamber and the residual gas combustion chamber.

2. A smokeless porous carbon production system as claimed in claim 1, wherein with exhaust gas discharged from the exhaust pipe, a negative pressure condition prevails in the furnace and an appropriate amount of air is taken in from the air regulation openings so that gas comprising the combustible gas is caused to flow through the sequential carbonization chamber, the residual gas combustion chamber and the exhaust pipe continuously in this order and then into the atmosphere.

3. A smokeless porous carbon production system as claimed in claim 1, further comprising a cyclone communicating with a downstream end of the exhaust pipe and wherein the combustible gas generated in the sequential carbonization chamber proceeds downward and is completely combusted in the high heat treatment chamber and the residual gas combustion chamber, so that the generation of dioxin and visible soot and smoke is suppressed as much as possible, whereby clean exhaust gas is discharged outside from the exhaust pipe via the cyclone.

4. A smokeless porous carbon production system as claimed in claim 1, further comprising a smoke sensor and a smoke consuming blower installed within the exhaust pipe, and wherein an amount of air to be taken in the furnace is increasably regulated so as to completely combust the exhaust gas by interlocking the air regulation openings or the smoke consuming blower with movement of the smoke sensor when visible soot and smoke are generated, so that the visible soot and smoke are prevented from being discharged outside from the exhaust pipe.

5. A smokeless porous carbon production system as claimed in claim 1, further comprising stroking levers and wherein the sequential carbonization chamber is arranged so that an upper side thereof is wide and tapered toward a lower side thereof; a side wall of the high heat treatment chamber coupled to the lowermost portion of the sequential carbonization chamber is formed perpendicularly; and the material or the initial carbide is stroked by causing the stroking levers to appear or disappear, the stroking levers being slidably provided horizontally near a lower portion of the sequential carbonization chamber, whereby to allow the contents to readily drop by their own weight.

6. A smokeless porous carbon production system as claimed in claim 1, wherein high heat receiving portions are comprised of heat resistant material and the system further comprises a cooling water tank mounted to a wall portion of the furnace and means for circulating cooling water so as to insulate the exterior of the system against high heat within the furnace.

7. A smokeless porous carbon production system as claimed in claim 1, further comprising a burner with an air blower, directed toward the inside of the residual gas combustion chamber and wherein the burner is operated first when operation of the system is started so as to cause the flow of gas accompanied with an ascending air current and operation of the system is started by setting fire to the material within the high heat treatment chamber.

8. A smokeless porous carbon production system as claimed in claim 1, further comprising a fire grate, a conveying means, a carbon receiving chamber and a guide chute for guiding the intermediate carbide to a carbon container via the fire grate, the guide chute being situated below the high heat treatment chamber and wherein the intermediate carbide successively drops by its own weight onto the guide chute; and the intermediate carbide fallen onto the guide chute is moved by the conveying means so as to contain the intermediate carbide in the carbon receiving container.

9. A smokeless porous carbon production system as claimed in claim 8, wherein the conveying means is a vibrating conveyor or a screw-type conveyor.

10. A smokeless porous carbon production system as claimed in claim 8, further comprising cooling means and wherein the whole or part of the guide chute is covered with the cooling means so as to rapidly cool the intermediate carbide.

11. A smokeless porous carbon production system as claimed in claim 8, further comprising a storage chamber for the carbon container and an open-and close cover for sealing an opening in the earth in which the carbon container is situated wherein the carbon container is embedded in the earth and the carbon container can be taken in and out of the earth via the open-and-close cover.

12. A smokeless porous carbon production system as claimed in claim 11, further comprising a second open-and-close cover, the carbon container having the second open-and-close cover and the second cover being capable of opening and closing for sealing the carbon container and wherein the second open-and-close cover is left open while the porous carbon is being fed into the carbon container with the open-and-close cover of the carbon container storage chamber closed and when the porous carbon is completely accommodated in the carbon container, the open-and-close cover of the carbon container is closed whereby to take out the carbon container by opening the open-and-close cover of the carbon container storage chamber.

13. A smokeless porous carbon production system as claimed in claim 1, wherein the sequential carbonization chamber is for heating a material comprising at least one of wood and bamboo.

* * * * *